United States Patent [19]

Keate et al.

[11] Patent Number: 4,916,405

[45] Date of Patent: Apr. 10, 1990

[54] SMART SWEEP APPARATUS FOR DATA RATE RECEIVERS

[75] Inventors: Christopher R. Keate, Salt Lake City; Jeffrey Mac Thornock, Layton; Bruce H. Williams, Sandy, all of Utah

[73] Assignee: Unisys Corp., Blue Bell, Pa.

[21] Appl. No.: 263,677

[22] Filed: Oct. 27, 1988

[51] Int. Cl.⁴ .................................................. H04L 27/22
[52] U.S. Cl. ........................................ 329/308; 331/4; 331/12; 331/DIG. 2; 375/87
[58] Field of Search .................. 329/50, 122, 124; 331/4, 12, 25, DIG. 2; 375/83, 87, 120

[56] References Cited

U.S. PATENT DOCUMENTS 4,092,606  5/1978  Ryan ................................ 329/124
4,814,719  3/1989  Guyer .............................. 329/124

Primary Examiner—Eugene R. Laroche
Assistant Examiner—Robert J. Pascal
Attorney, Agent, or Firm—John B. Sowell; Robert S. Bramson; Mark T. Starr

[57] ABSTRACT

Apparatus is provided for locking onto a severe doppler shifted data modulated carrier signal. A phase lock loop of the type having a data detection branch, a carrier tracking branch and a voltage controlled oscillator branch is modified to provide a summing circuit at the input of the voltage control oscillator in the voltage controlled oscillator branch. A sweep control circuit is connected to the input of the summing circuit for sweeping the voltage controlled oscillator through a range of frequencies which encompass the doppler shifted carrier frequency. An automatic frequency control circuit is connected to the input of the summing circuit for automatically disconnecting the sweep control circuit from the summing circuit when the frequency of the voltage controlled oscillator reaches a predetermined value defining a window which encompasses only the center frequency of the doppler shifted carrier frequency. The automatic frequency control circuit is adapted to drive the output of the voltage controlled oscillator to the center frequency of the doppler shifted carrier frequency without overshoot and then enable the phase lock loop to phase lock onto the phase of the doppler shifted carrier frequency to provide a locked on condition.

12 Claims, 4 Drawing Sheets

SMART SWEEP APPARATUS FOR DATA RATE RECEIVERS

BACKGROUND OF THE INVENTION

1. Field of the Invention

The present invention is related to binary phase shift keyed (BPSK) receivers of the type employed in very high speed aircraft and satellite vehicles. More particularly, the present invention is related to low to medium data rate receivers that incur high acquisition time due to doppler phase shift.

2. Description of the Prior Art

Prior art BPSK receivers employ phase locked loops (PLL) to control the voltage controlled oscillator (VCO) to obtain the center frequency of the carrier signal. Such prior art receivers, when not subject to doppler effect, employed PLLs which had a natural pull-in range which would permit acquisition of the carrier signal. However, low to medium data rate receivers have very narrow loop band widths or pull-in ranges that do not encompass the doppler shifting of the carrier signal for receivers that are installed in high speed aircraft and moving satellites.

Prior art low to medium data rate receivers have employed sweep circuits which change the frequency of the VCO and force the frequency of the PLL through the center frequency of the doppler affected carrier frequency. Such sweep circuits and phase locked loops suffer from two major problems. First, they were limited to sweeping the frequency of the VCO at the rate of frequency change which permits the phase locked loop to lock onto the phase of the doppler shifted frequency. Such prior art phase locked loops required narrow band width carrier recovery loops to reduce phase jitter. Such phase locked loops had band widths limited to approximately 1% of the data rate. Such small band widths required slow sweeps which caused extremely high acquisition times especially when there was a large frequency uncertainty. When a large frequency of uncertainty was encountered, a wide range frequency sweep circuit was required. Prior art frequency sweep circuits often employed base band square law detectors which generate side bands that promote phase locking on side band signals.

The second problem is inherent in phase locked loops because the phase locked loop cannot distinguish the side band signals (or false signals). When sweeping the voltage controlled oscillator in one direction, the phase lock detector is designed to indicate that a phase locked condition has occurred and attempts to lock onto the incoming signal. If the sweep circuit sweeps too fast, it is possible to overshoot the side band signal or the true center frequency signal and the acquisition time is prolonged during seeking or subsequent reverse sweeping procedures. This problem is exacerbated because there is an infinite number of side band signals and only one true center frequency signal.

The above mentioned problems have yet to be solved for receivers subject to doppler phase shift. Present high speed aircraft still communicate with each other employing FM or amplitude modulated voice channels which require pilot attention. Present high speed aircraft do not have computer systems which assimilate important information and communicate it to other aircraft at low to medium digital data rate frequencies that could be encrypted by known techniques.

It would be extremely desirable to provide a low to medium data rate receiver which has faster acquisition time than receivers known heretofore. More importantly, it would be desirable to eliminate false lock-on of side band or harmonic signals and to eliminate overshoot seek sweeping during acquisition. Such a receiver would permit rapidly moving aircraft to automatically transmit and receive valuable data.

SUMMARY OF THE INVENTION

It is a principal object of the present invention to provide a new and improved data rate receiver which has faster acquisition time than receivers known heretofore.

It is another principal object of the present invention to provide a new data rate receiver which eliminates false lock-on of side band or harmonic signals.

It is another principal object of the present invention to provide a novel automatic frequency lock loop (AFLL) circuit which forces the frequency error in the phase lock loop to a zero condition and eliminates false lock-on to side band signals.

It is another principal object of the present invention to provide a novel automatic frequency sweep apparatus which sweeps the range of frequency uncertainty at rates ten or more times faster than sweep circuits known heretofore.

It is another principal object of the present invention to provide a novel automatic frequency lock loop circuit which sweeps a predetermined range of frequencies that contains the doppler affected center frequency at much higher sweep rates than the response rate of the phase locked loop.

It is a general object of the present invention to provide a new and improved data rate receiver that may be made from cheaper components.

It is a general object of the present invention to provide a novel date rate receiver designed for low to medium data rate frequencies which may be employed at data rate frequencies above 1 megahertz by changing components in the circuit that are designed for the higher frequency.

According to these and other objects of the present invention there is provided apparatus for receiving binary phase shift keyed signals which are subject to doppler shift. The receiver includes an automatic frequency lock loop (AFLL) which forces the frequency of the voltage controlled oscillator in the phase locked loop substantially to center frequency of the carrier signal or zero frequency error and further includes means for disconnecting the automatic frequency lock loop from the phase locked loop to permit the phased lock loop to lock onto the phase of the doppler shifted centered frequency of the carrier.

DESCRIPTION OF THE PREFERRED EMBODIMENT

Figure 1:
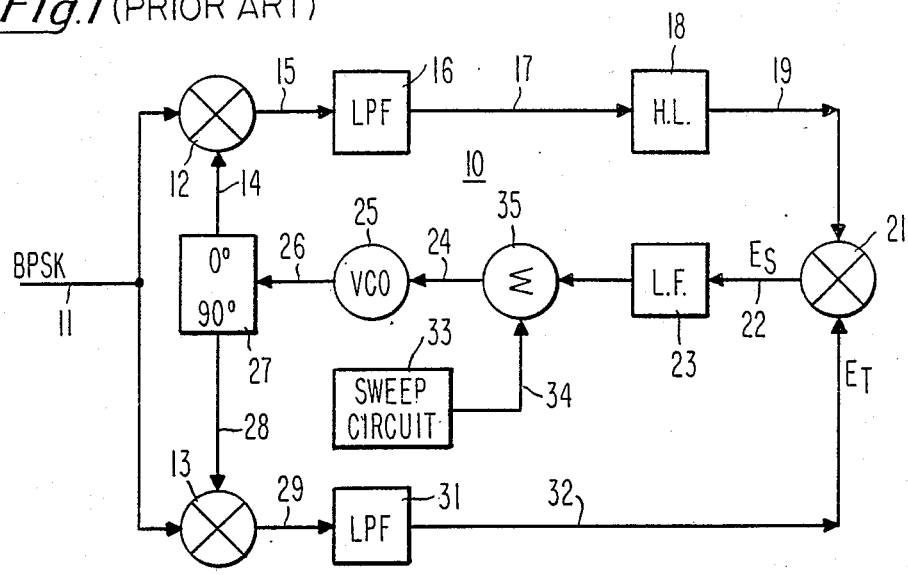
FIG. 1 is a block diagram of a typical prior art phase locked loop (PLL) with a conventional sweep circuit.

Refer now to FIG. 1 showing a block diagram of a typical prior art phase locked loop 10 having a binary phase shift key signal input at line 11. The signal on line 11 is applied to two mixers 12 and 13. The mixer 12 has a second input on line 14 from the voltage controlled oscillator which produces a down converted demodulated output signal on line 15 which is applied to a low pass filter 16. The output of low pass filter 16 on line 17 is applied to a hard limiter 18 to produce the desired data signals on output a line 19 which are applied to a prior art type analog multiplier 21 to produce the phase error signal ($E_S$) on line 22. This signal is applied to a low pass filter 23 which cleans up the error signal and controls the phase locked loop band width. The output of low pass filter 23 is applied as a voltage error signal on line 24 to the voltage control oscillator 25. The frequency output signal on line 26 from voltage controlled oscillator 25 is applied to a quadrature power splitter 27 to produce the an inphase signal on line 14 in the phase locked loop and to produce a 90° phase shifted quadrature signal on line 28 which is applied to the mixer 13 to produce a tracking error voltage signal on line 29. The error signal is applied to a low pass filter 31 which serves as a matched filter to maximize the signal to noise ratio on output line 32. The tracking error signal ($E_T$) is applied to the analog multiplier 21 to produce the aforementioned error signal $E_S$ on line 22 in the phase locked loop.

When the frequency of the incoming signal on line 11 is outside of the pull-in range of the phase locked loop 10, then a DC voltage must be applied to the VCO 25 in order to recover or acquire the incoming signal. For this purpose a sweep circuit 33 produces a sweep voltage signal on line 34 which is applied to the summing circuit 35 to produce the corrected or supplemented error signal on line 24 to sweep the voltage control oscillator through the range of frequencies which encompasses the binary phase shift key signal on input line 11. When the voltage controlled oscillator reaches the frequency of the input signal on line 11 a lock detector (not shown) is employed to disconnect the sweep voltage on line 34 from the summing circuit 35. Such prior art circuits are known to require excessive acquisition time because the phase lock loop band width is very narrow for low to medium data rate frequency receivers. If the sweep rate is excessive, it is possible to sweep by the correct center frequency without the phase lock loop locking onto and acquiring the input signal. Typically, low to medium data rate receivers have phase lock loops 10 whose band width is approximately 1% of the data rate frequency. Depending on the total frequency uncertainty due to doppler effect such prior art sweeps circuits and phase locked loops may require up to one full minute to achieve acquisition.

Figure 2:
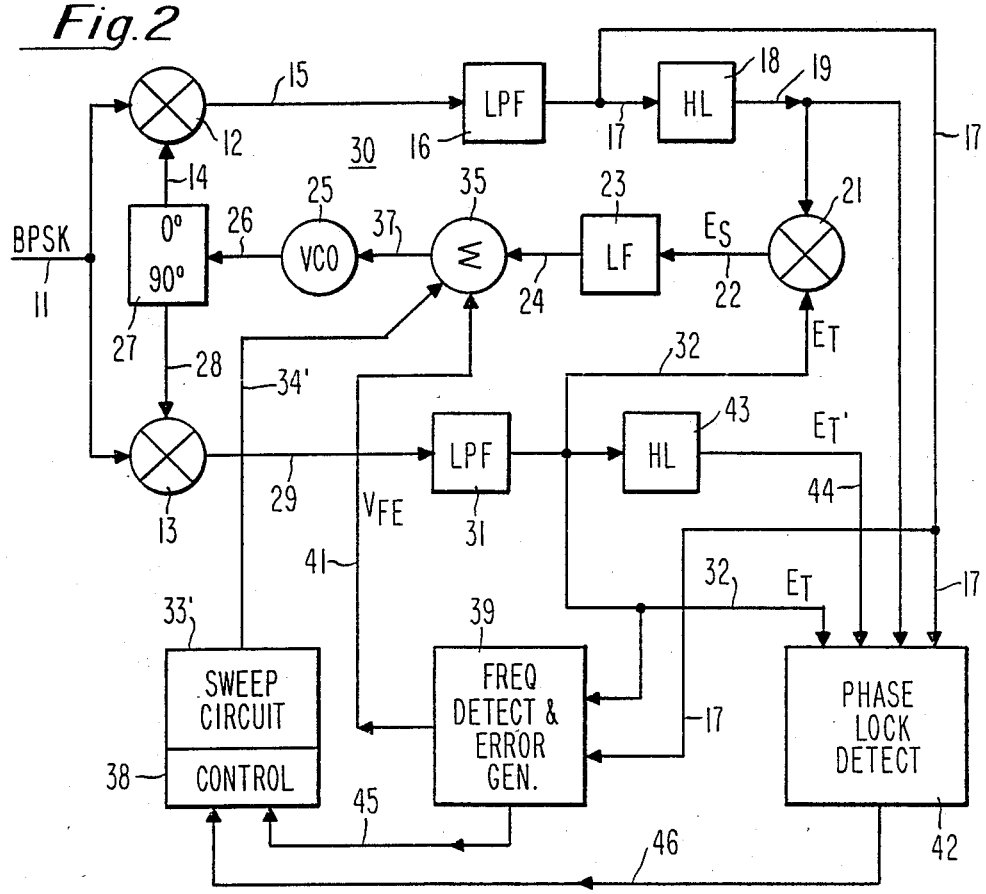
FIG. 2 is a simplified block diagram of a preferred embodiment of the present invention receiver which includes an automatic frequency lock loop.

Refer now to FIG. 2 showing a simplified block diagram of the preferred embodiment of the present invention. The same BPSK input signal on line 11 is applied to identical mixers 12 and 13 which receive the aforementioned signals from input lines 14 and 28 as explained hereinbefore. The upper loop of phase locked loop 30 operates in the same manner as the prior art phased locked loops and the elements and lines are numbered the same as described hereinbefore. When the input frequency on line 11 is outside of the band width of the phase locked loop 30, the voltage controlled oscillator 25 must be swept through the center frequency of the incoming signal. Sweep circuit 33' provides a sweep voltage signal on line 34' which is applied to a three input summing circuit 35' to produce an error signal on line 37 as an input to the voltage controlled oscillator. Sweep circuit 33' is not constrained in its sweep frequency by the phase locked loop band width as in phase locked loop 10 but may be swept at a very high speed until it reaches a predetermined plus or minus frequency error and is then disconnected from the summing circuit 35' by controls 38 to be explained in more detail hereinafter. At the time the sweep circuit 33' is disconnected from the summing circuit 35', the frequency detect and error generator 39 is connected into the automatic frequency lock loop as will be described in more detail hereinafter. The frequency error signal ($V_{FE}$) on line 41 is applied to the summing circuit 35' to produce a voltage frequency error signal that drives the phase locked loop 30 to a zero frequency error. At this point in time the frequency detect and error generator 39 is disconnected from the automatic frequency lock loop so that the only input signal to the summing circuit 35' is the error signal on line 24 of the phase locked loop 30. At this point in time the voltage controlled oscillator 25 is at the center frequency of the carrier so that the phase locked loop 30 does not have to compensate for any frequency error and can rapidly lock on to the phase of the carrier signal.

The output of the low pass filter 31 on line 32 produces the aforementioned error tracking signal $E_T$ which is now applied to a hard limiter 43 and the phase lock detector 42. The output of the hard limiter 43 on line 44 is a hard limited error tracking signal ($E_T$) that is applied to the phase lock detector. In similar manner the signal at the input of hard limiter 18 on line 17 and the output of hard limiter 18 on line 19 is applied to the phase lock detector 42. The input signals to frequency detect and error generator 39 are the aforementioned signals from the low pass filters 16 and 31 on line 17 and 32. The output of frequency detector 39 and phase lock detector 42 on lines 45 and 46 are couple to the aforementioned control 38. When both signals on lines 45 and 46 indicate that neither the frequency detector 39 or the phase lock detector 42 are active, the sweep control circuit 33' is activated. Stated differently if either the frequency detector 39 or the phase lock detector 42 is active and attempting to lock the voltage controlled oscillator 25 onto the incoming signal then the sweep circuit 33' is deactivated. As will be explained in detail hereinafter the phase lock detector 42 preferably remains in the receiver circuit at all times. The frequency detector and error generator signal on line 41 is only active when the voltage control oscillator has reached a frequency that is very close to the center frequency and is predetermined to eliminate side band and false side band lock signals.

The sweep circuit 33' may be operated in a very fast sweep mode until it reaches the window defined by the frequency detector and error generator 39, then the frequency detect and error generator may be operated very fast to drive the frequency of the phase lock loop 30 to zero frequency error. Because there is no overshoot, the phase lock loop may then be operated as a prior art phase lock loop to lock onto the phase discrepancy and not the frequency error.

Figure 3:
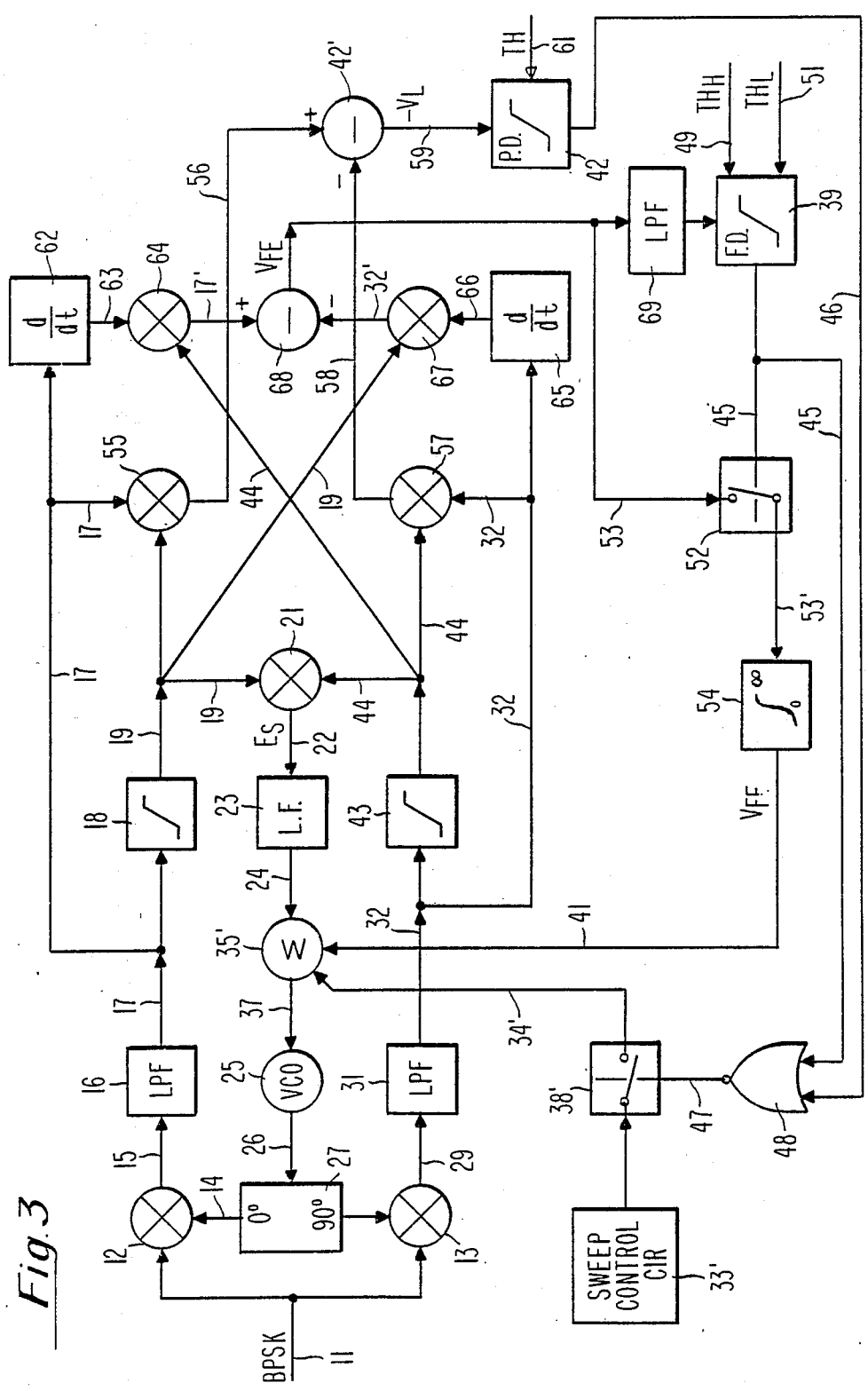
FIG. 3 is a more detailed block diagram of the preferred embodiment of the present invention shown in FIG. 2 and further showing the mode of operation of the three lock circuits.

Refer now to FIG. 3 showing a more detailed block diagram of the preferred embodiment invention. The numbers of the lines and elements in FIG. 3 which are identical to the elements and lines in FIG. 2 are numbered the same in FIG. 3 and do not require additional explanation herein. The mode of operation of the three sweep or lock circuits shown in FIG. 2 will now be explained. The aforementioned sweep control circuit 33' has an output line 34' which is connected to the aforementioned summing circuit 35+ through a switch or control 38'. The switch is operated by control signal line 47 at the output of NOR circuit 48. When both input signals 45 and 46 from the frequency detect and phase detect circuits 39 and 44 respectively are absent, switch 38' is closed and the sweep control circuit 33' produces a sweep voltage signal on line 34' which causes the voltage control oscillator 25 to sweep through the frequency of the incoming signal on line 11. Before the voltage control oscillator 25 reaches the center frequency of the signal on line 11 it reaches the window or threshold set at high threshold line 49 and the low threshold line 51 at the frequency detector circuit 39. When the voltage controlled oscillator frequency sweeps into the range of the window defined by the two thresholds on lines 49 and 51, an output signal is raised on line 45 which opens the sweep control circuit switch 38' disconnecting its output sweep signal from the summing circuit 35' and simultaneously closes switch 52 and connects the voltage frequency error signal on line 53 to output line 53' as an input to the automatic frequency lock loop integrator 54 which produces a frequency error signal on line 41 as mentioned hereinbefore. The signals on lines 17 and 19 occurring before and after hard limiter 18 are applied to mixer 55 to produce an output signal on line 56 which is applied as a positive input signal to subtractor 42' which is part of the phase lock detector 42. Similarly, the signals before and after hard limiter 43 on lines 32 and 44 are applied to a second mixer 57 whose output on line 58 is applied as a negative input to subtractor 42' to produce a desired DC signal $V_L$ on line 59 indicative of whether the phase lock loop is properly locked or not. The threshold voltage input signal on line 61 to phase lock detector 42 is employed to assure that a true phase lock or high output signal is produced on line 59 indicative of a phase lock condition. The two input signals on lines 32 and 17 to the frequency detect error generator 39 in FIG. 2 are employed to derive the signal on line 53 shown as will now be explained. The before signal on line 17 is applied to a differentiating circuit 62 to produce a differentiated output signal on line 63 which is applied to a multiplier 64 which has a cross-coupled output signal from the output of hard limiter 43 on line 44. Similarly, the signal on line 32 is applied to a differentiating circuit 65 whose output on line 66 is applied to a second multiplier 67 along with the cross-coupled output signal on line 19 from hard limiter 18. The output of multiplier 64 on line 17' is applied as a positive input to subtractor 68. The output of multiplier 67 on line 32' is applied as a negative input to subtractor 68 to produce the aforementioned voltage frequency error signal $V_{FE}$ on line 53. The voltage error signal on line 53 is applied via line 41 to the summing circuit 35'. The signal on line 53 is processed in the integrating circuit 54 which integrates all of the noise out of the voltage frequency error signal and by the process of integration produces the proper DC voltage signal on line 41 to correct the voltage controlled oscillator 25 so that the voltage frequency error signal on line 53 is driven to zero. The automatic frequency lock loop includes the output path signal on line 53 and the input DC signal path on line 41 and both branches of the phase lock loop therebetween. Thus, it will be understood that a major portion of the automatic frequency lock loop is superimposed on the phase lock loop and employ the same structure and signal lines which decreases the cost of the system.

Figure 4:
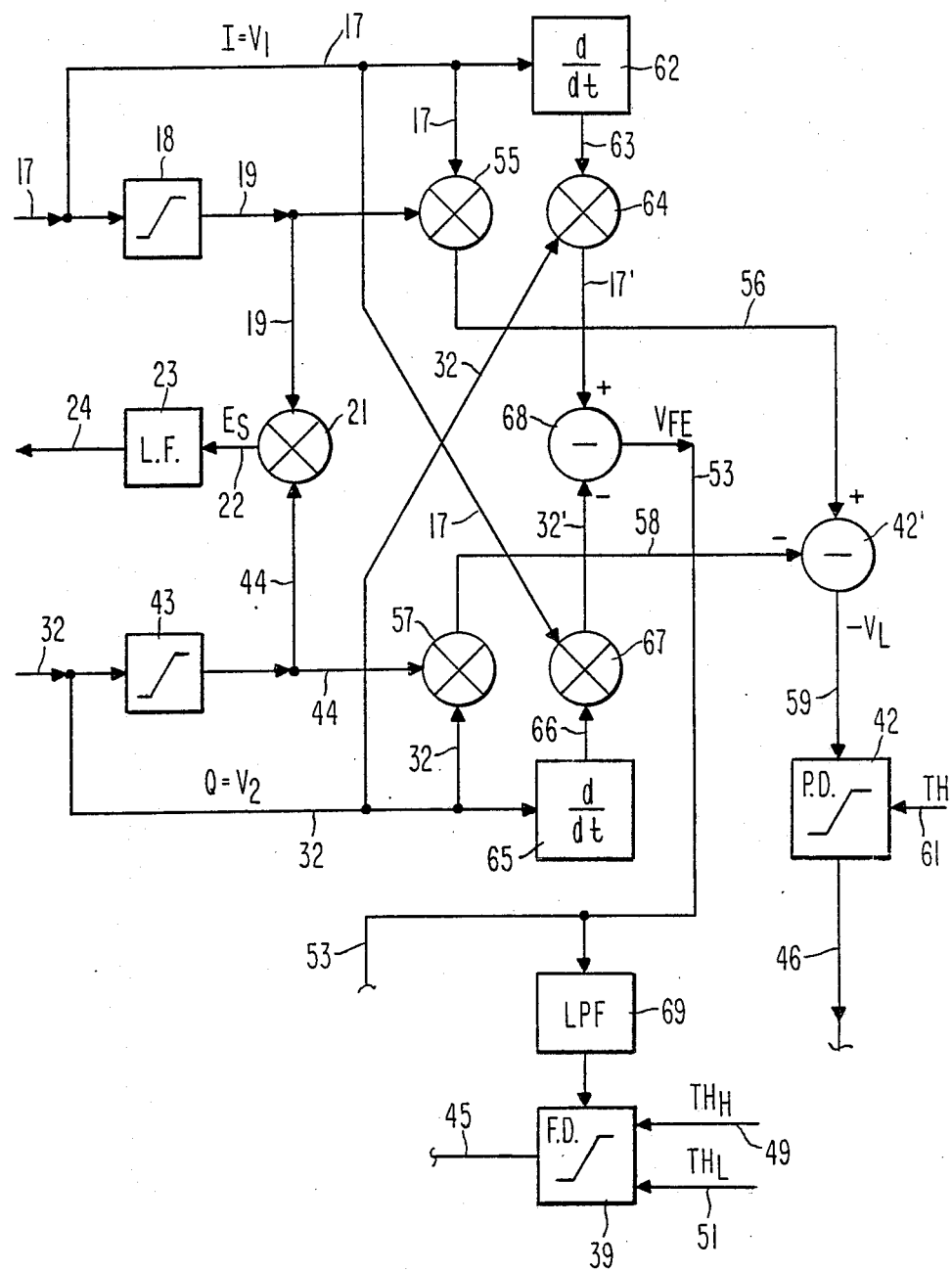
FIG. 4 is a block diagram of a modification of the output detector circuits of the circuit shown in FIG. 3.

Refer now to FIG. 4 showing a block diagram of a modification of the output detection circuits for the phase lock detector 42 and frequency detector 39. The output signals on line 56 and 57 to the subtractor 42' are unchanged. However, the cross-coupled signal from the output of the hard limiters 18 and 43 which are applied to the multiplier 67 and 64 respectively are now taken from the input side of the hard limiters 18 and 43 and applied to the multipliers 64 and 67. Thus multiplier 64 has a line 32 input instead of the former line 44 input. Similarly, multiplier 67 has a line 17 input instead of the former line 19 input. The multipliers 64 and 67 in the FIG. 4 embodiment must be analog multipliers which are expensive. The multipliers 64 and 67 in the FIG. 3 embodiment may be made inexpensively by employing the high speed electronic switch analog multipliers set forth in our co-pending application Ser. No. 07/222,699 filed 22 July 1988 for "A High Frequency Lock Detecting Circuit".

The detecting circuits and multiplier shown in FIG. 4 employ true analog trigametric inputs which enable trigametric analysis of the signal. It can be shown that the signals on line 17 and 32 identified as $V_1$ and $V_2$ respectively are processed in the circuits shown to produce the following trigametric analysis that produces the output voltage frequency error signal $V_{FE}$ which is equal to $W_B$ where $W_B$ is the frequency difference between the incoming signal and the output signal on line 11 of the voltage control oscillator on line 26 as follows:

$$V_1 = \cos W_B(t) \times D(t)$$

$$V_2 = \sin W_B(t) \times D(t)$$

@ line 63 $V = \cos W_B(t) \times D(t) + \sin W_B(t) \times D(t) \times W_B$

@ line 66 $V = \sin W_B(t) \times D(t) + \cos W_B(t) \times D(t) \times W_B$

@ line 53 $V_{FE} = V_1 V_2 - V_2 V_1 = W_B$

Figure 5:
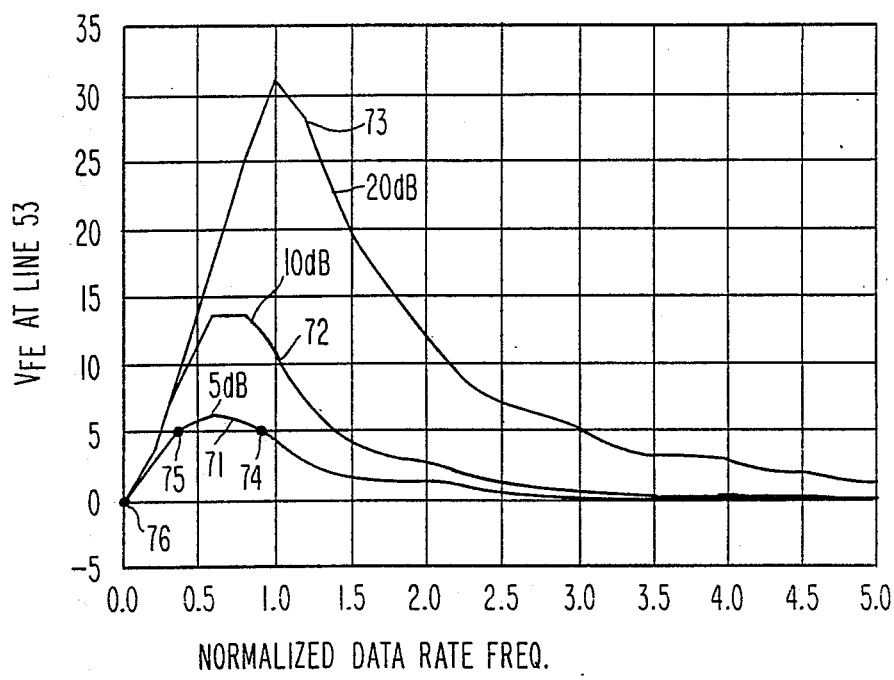
FIG. 5 is a wave form diagram or part of an S-curve diagram of the voltage frequency error signal at the output of the detector versus the frequency error between the input signal frequency and the frequency at the output of the voltage control oscillator.

Refer now to FIG. 5 showing a wave form diagram commonly referred to an S-curve of voltage frequency error at the output of the detector versus the frequency error between the input signal frequency and the frequency at the output of the VCO. The wave form 71 at a signal to noise ratio of 5 db represents the lowest signal to noise ratio at which it is desired to operate the present invention receiver. A 5 decibels signal to noise ratio is considered to be a very low value for BPSK receivers. Thus, the ability of the present invention to operate at this low signal to noise ratio without false lock on illustrates the desirability of the present invention. The wave forms 72 and 73 at signal to noise ratios of 10 and 20 decibels respectively will also operate at the same thresholds to be set for the frequency detector at the lower signal to noise ratio shown on wave form 71. It will be noted that the voltage peak for wave form 71 occurs at approximately 6½ volts $V_{FE}$ in order to assure that the frequency detector is triggered under substantially all signal to noise operating conditions. A value of approximately 5 volts is set for the high threshold value $TH_H$ on line 49 as shown in FIG. 3. Similarly, a value of the low threshold for the same S-curve which extends in the negative direction (not shown) is set at −5 volts on line 51. If the sweep is occurring from left to right the five volt threshold will first sense the point 75 on the signal to noise ratio curve 71. This immediately closes the switch 52 and opens the switch 38' shown in FIG. 3. Similarly, if the sweep is from right to left the point 74 is sensed producing an output signal on line 45 from the frequency detector 39 shown in FIG. 3 that closes switch 52 and opens switch 38'. Once switch 52 is closed, the voltage signal on line 41 at the output of integrator 54 produces a signal which follows the signal to noise ratio curve to the frequency zero point 76 that is a stable controlled condition. Thus, the signal on line 45 at the stable control condition point 76 may be employed to open switch 52 because the phase lock loop no longer requires the control signal on line 41 and can phase lock the voltage control signal on line 26 to the incoming BPSK signal on line 11 without the possibility of frequency error or false lock conditions.

It will be noted that by employing the lower threshold value to switch in the automatic frequency lock loop that values of higher signal to noise ratio shown on wave forms 72 and 73 will be switched in earlier thus insuring faster acquisition because the signals on line 41 will have greater values for higher values of signal to noise ratio, thus, accomplishing the locked on condition faster.

Having explained a preferred embodiment of the present invention and a modification thereof for purposes of explaining the use of more expensive analog multipliers it will be understood that the present invention circuit shown in FIG. 3 can be made more cheaply than prior art circuits employing analog multipliers. Not only is the FIG. 3 circuit made cheaper using high speed multipliers, but the automatic frequency lock loop is both faster and more accurate than prior art circuits. The terminology smart sweep is applied to the automatic frequency lock loop circuit because the direction of sweep necessary to drive the frequency error to zero is sensed by the detection circuit so that sweeping circuits which repeat their sweep operations are no longer necessary. Under actual conditions it has been observed that the signal to noise ratios are much higher than the lower 5 decibel conditions set for the low threshold condition. Thus, the smart frequency sweep of the automatic frequency lock loop circuit usually takes over shortly after sweep has started or even before sweep is necessary and drives the center frequency to the frequency zero at point 76 shown on FIG. 5.

Further it will be noted that under very high signal to noise ratio conditions it was possible in the prior art to lock on a side band or false signal which does not or will not occur employing the smart sweep automatic frequency lock loop. If acquisition is attempted and the signal to noise ratio is already high enough to come within the threshold window set at the frequency detector 39 it is not necessary to employ the sweep control circuit 33', thus, much faster acquisition is achieved. Under simulated operating conditions the acquisition time of the present invention receiver can be as low as 3 seconds in contrast to acquisition times of about 1 minute for prior art receivers.

What is claimed is:

1. Apparatus for receiving and locking onto doppler shifted data rate signals, comprising:
    a phase lock loop of the type having a data detection branch, a carrier tracking branch and a voltage controlled oscillator branch,
    a voltage controlled oscillator in said voltage controlled oscillator branch,
    a summing circuit connected in said voltage control branch at the input of said voltage control oscillator,
    a sweep control circuit connected to the input of said summing circuit for sweeping said voltage control oscillator through a range of frequencies which contain the doppler shifted carrier frequency,
    an automatic frequency control circuit connected to the input of said summing circuit for automatically adjusting the frequency of said voltage controlled oscillator to the center frequency of the doppler shifted carrier frequency without overshoot to enable the phase lock loop to lock onto the phase of said doppler shifted carrier frequency, and
    said automatic frequency circuit comprising a frequency detector and threshold reference means for setting threshold voltage signal error values at the frequency detector defining a frequency window which contains the center frequency of said doppler shifted carrier frequency.

2. Apparatus as set forth in claim 1 wherein said automatic frequency control circuit further comprises,
    a pair of mixers each having an output connected to a subtractor circuit and their inputs coupled to each of said branches of said phase lock loop,
    said subtractor circuit having a voltage frequency error signal ($V_{FE}$) output coupled to said frequency detector and to said summing circuit.

3. Apparatus as set forth in claim 2 wherein said automatic frequency control circuit further comprises switch means coupled to said frequency detector for coupling said voltage frequency error signal ($V_{FE}$) to said summing circuit and for disabling said sweep control circuit from said summing circuit.

4. Apparatus as set forth in claim 3 wherein said switch means for disabling said sweep control circuit to said summing circuit comprises a normally closed electronic switch actuated to an open position by said frequency detector when said sweep control circuit is actuated.

5. Apparatus as set forth in claim 3 wherein said switch means further comprises a NOR circuit coupled to the frequency detector for deactivating said sweep control circuit when said voltage frequency error signals ($V_{FE}$) is at a value between said threshold voltage signal error values.

6. Apparatus as set forth in claim 2 wherein said automatic frequency control circuit comprises two inputs to each of said mixers comprising a differentiated base band input signal from one branch and a non-differentiated base band input signal from the other branch.

7. Apparatus as set forth in claim 6 where said non-differentiated base band input signal into said mixers is hard limited.

8. Apparatus as set forth in claim 1 which further includes a phase lock detector having a threshold input set to detect a phase lock condition only on the center frequency of said doppler shifted carrier frequency.

9. Apparatus as set forth in claim 5 wherein said phase lock detector provides a lock detection output signal coupled to the input of said NOR circuit.

10. Apparatus as set forth in claim 3 which further includes an integrating circuit coupled in series between said voltage frequency error signal ($V_{FE}$) and said summing circuit for forcing said voltage controlled oscillator to a center frequency exactly equal to said doppler shifted carrier frequency without overshoot.

11. A method of locking onto severe doppler shifted data modulated carrier signals comprising the steps of:

coupling said doppler shifted carrier signal to a phase lock loop of the type having a data detection branch and a carrier tracking branch mutually connected to a voltage controlled oscillator branch, providing a summing circuit at the input of the voltage controlled oscillator in said voltage controlled oscillator branch, connecting a sweep control circuit to said summing circuit for adjusting said voltage controlled oscillator frequency to a predetermined voltage frequency defining a window which contains the center frequency of said doppler shifted carrier frequency, disconnecting said sweep control circuit from the input of said summing circuit when said sweep control circuit reaches the frequency values defining said frequency window, connecting an automatic frequency control circuit to said summing circuit when simultaneously disconnecting said sweep control circuit from said summing circuit, adjusting the frequency of said voltage controlled oscillator with said automatic frequency control circuit to the center frequency of said doppler shifted carrier frequency to provide a zero frequency condition, and subsequently adjusting the phase of said voltage controlled oscillator output signal to the phase of the doppler shifted carrier frequency to provide a lock condition.

12. The method as set forth in claim 11 which further includes the steps of:

maintaining said lock condition onto the frequency and the phase of said doppler shifted carrier frequency by applying phase lock loop phase error signals and frequency error signals to said summing circuit at the input of said voltage controlled oscillator.

* * * * *